United States Patent [19]
Okimoto et al.

[11] Patent Number: 5,519,521
[45] Date of Patent: May 21, 1996

[54] ACTIVE MATRIX LIQUID CRYSTAL DISPLAY DEVICE WITH DIVISIONAL COMMON ELECTRODES ALIGNED WITH DIVISIONAL REGIONS OF TFTS

[75] Inventors: Hiroyuki Okimoto, Hino; Syunichi Sato, Kawagoe, both of Japan

[73] Assignee: Casio Computer Co., Ltd., Tokyo, Japan

[21] Appl. No.: 63,007

[22] Filed: May 17, 1993

[30]   Foreign Application Priority Data

May 19, 1992  [JP]  Japan .................................. 4-125985

[51] Int. Cl.⁶ ..................................................... G02F 1/136
[52] U.S. Cl. .................................................. 359/59; 359/57
[58] Field of Search ........................................ 359/59, 57

[56]              References Cited

U.S. PATENT DOCUMENTS 4,697,887  10/1987  Okada et al. ............................ 359/59

FOREIGN PATENT DOCUMENTS 0224388  6/1987  European Pat. Off. .
3-063623  3/1991  Japan ........................................ 359/59

OTHER PUBLICATIONS

Patent Abstracts of Japan, vol. 15, No. 433 (P–1271), Nov. 5, 1991, Abstract of JP 3–180 817 (Toshiba) Aug. 6, 1991.
Patent Abstracts of Japan, vol. 14, No. 332 (P–1077), Jul. 17, 1990, Abstract of JP 2–111 920 (Toppan) Apr. 24, 1990.
Patent Abstracts of Japan, vol. 16, No. 60 (P–1312), Feb. 14, 1992, Abstract of JP 3–259 123 (Hitachi) Nov. 19, 1991.

*Primary Examiner*—Anita Pellman Cross
*Attorney, Agent, or Firm*—Frishauf, Holtz, Goodman, Langer & Chick

[57]                ABSTRACT

A liquid crystal display device comprises a first substrate on which a plurality of thin-film transistors, a plurality of pixel electrodes respectively connected to the thin-film transistors, a plurality of gate lines for connecting gate electrodes of the thin-film transistors, and a plurality of drain lines for connecting drain electrodes of the thin-film transistors are arranged in a matrix pattern, a second substrate on which a plurality of divisional common electrodes which face the plurality of pixel electrodes are formed, and a liquid crystal material encapsulated by the first and second substrates and a sealing member, and interposed between the plurality of pixel electrodes and the plurality of divisional common electrodes. The matrix pattern on the first substrate is formed by a photolithograpy process comprising a step of divisionally exposing photoresist in a plurality of divisional regions by using a stepper. The plurality of divisional common electrodes have sizes corresponding to the divisional regions divisionally exposed by the stepper and are separated from one another.

20 Claims, 5 Drawing Sheets

ACTIVE MATRIX LIQUID CRYSTAL DISPLAY DEVICE WITH DIVISIONAL COMMON ELECTRODES ALIGNED WITH DIVISIONAL REGIONS OF TFTS

FIELD OF THE INVENTION

The present invention relates to an active matrix liquid crystal display device using a thin-film transistor as an active element.

DESCRIPTION OF THE RELATED ART

An active matrix liquid crystal display device using a thin-film transistor as an active element comprises a pair of panels which face each other with a liquid crystal layer interposed therebetween. A plurality of thin-film transistors and a plurality of pixel electrodes connected thereto are arranged in a matrix on one of the panels. A common electrode is formed on the other panel. A portion where a pixel electrode and the common electrode face each other forms a pixel. The display device is constituted by a plurality of pixels arranged in a matrix.

A conventional active matrix liquid crystal display device has a structure as shown in FIG. 5, wherein an equivalent circuit of the thin-film transistor is depicted as a plan view. The liquid crystal display device has a pair of transparent panels 10 and 20 adhered to each other by a frame-shaped sealing member 30. Liquid crystal is injected in a liquid crystal injection region surround by the sealing member 30 between the panels 10 and 20.

The panel (TFT panel) 10 comprises a transparent substrate 11 formed of glass or the like. A plurality of thin-film transistors (TFTs) 12 and pixel electrodes 17 respectively connected to the TFTs are arranged in a matrix on the TFT panel 10. A gate line GL is provided for a row of pixel electrodes and a data line DL is provided for a column of pixel electrodes. The TFTs 12 are formed on intersections of the gate lines GL and data lines DL. The pixel electrodes 17 are respectively connected to the TFTs 12. The TFTs 12 and the pixel electrodes 17 are covered by a protecting insulation film (not shown), on which an orientation film (not shown) is formed.

The other panel (opposite panel) 20 comprises a transparent substrate 21 formed of glass or the like and a common electrode 24 which faces the pixel electrodes 17 of the TFT panel 10. The common electrode 24 is one element which occupies the entire area of the display region (the region of the TFT panel 10 where the pixel electrodes are arranged). The common electrode 24 is covered by a protecting insulation film (not shown), on which an orientation film (not shown) is formed.

The above active matrix liquid crystal display device is driven by a gate signal applying circuit 41 connected to terminals of the gate lines GL, a data signal applying circuit 42 connected to terminals of the data lines DL, and a common signal applying circuit 43 connected to a terminal of the common electrode 24.

Each of the TFTs 12 having a gate electrode, a semiconductor film, and source and drain electrodes and the like, and the pixel electrodes 17 are formed as follows: first, respective thin films are formed on the substrate and then, the thin films are patterned by photolithography. In the photolithograph process, the display region in which TFTs 12 and pixel electrodes 17 are arranged is divided into a plurality of exposure regions and the divided exposure regions are exposed one by one (divisional exposure).

However, in the TFT panel formed by the abovementioned divisional exposures, the exposure regions, each exposed by one exposure step, vary in current-voltage characteristics of the TFTs 12 formed on the substrate 11. In addition, the exposure regions vary in electro-optical characteristics of the pixels. Hence, the exposure regions maintain different voltages between the common electrode and the respective pixel electrodes 17.

The above problem results from an error of alignment of the substrate and the exposure mask when photoresist is exposed. Since the exposure regions differ in degree of the error, the positional relationship between the gate electrode and the source or drain electrode of each of the TFTs formed on the substrate 11 differs in every exposure region.

The current-voltage characteristics of a TFT 12 and the electro-optical characteristic vary depending on the positional relationship between the gate electrode and the source and/or drain electrode, i.e., the ratio of the capacitance between the gate electrode and the source electrode to the capacitance between the gate electrode and the drain electrode. Therefore, the positional relationship between the gate electrode and the gate and/or source electrode varies in every exposure region. As a result, the respective exposure pixels have different electro-optical characteristics. Accordingly, the voltages maintained in a pixel with respect to one data signal applied to the pixel electrode 17 from the data line DL through the TFT 12 are different for the respective exposure regions.

The active matrix liquid crystal display device has storage capacitors (not shown in FIG. 5) respectively connected to the pixel electrodes 17 of the TFT panel 10. Charge applied to a pixel electrode is stored in the storage capacitor connected thereto when a drive signal is selected, so that the potential of the pixel electrode 17 can be maintained even when a drive signal is not selected. Each storage capacitor has, on the substrate 11 of the TFT panel 10, a capacitor electrode which faces a pixel electrode with a gate insulating film interposed therebetween.

In a TFT panel having the above-mentioned storage capacitors, if the electrodes of the TFTs 12, the pixel electrodes 17, and the capacitor electrodes are patterned by divisionally exposing the photoresists, the pixels in an exposure region have electro-optical characteristics different from those in another exposure region. In addition, since the storage capacitors in an exposure region have different capacitances due to deviation of the positions of the capacitor electrodes and the pixel electrodes, the exposure regions vary in voltage maintained in the pixels.

In the conventional active matrix liquid crystal display device shown in FIG. 5, since the exposure regions vary in voltage maintained in the pixel electrodes of the TFT panel 10, different electrical fields are applied to the liquid crystal of pixels in the exposure regions.

Therefore, the conventional active matrix liquid crystal display device has a drawback that a displayed image is partitioned into the exposure regions, since the exposure regions differ in display brightness and contrast.

SUMMARY OF THE INVENTION

An object of the present invention is to provide an active matrix liquid crystal display device which displays an image of uniform brightness and contrast.

To achieve the above object, according to the present invention, there is provided an active matrix liquid crystal display device comprising:

a first substrate having a plurality of thin-film transistors, a plurality of pixel electrodes connected to the thin-film transistors, a plurality of gate lines connecting gate electrodes of the thin-film transistors, a plurality of drain lines connecting drain electrodes of the thin-film transistors;

a second substrate having a plurality of divisional common electrodes, wherein the thin-film transistors, the pixel electrodes, the gate lines, and the drain lines are pattern-formed on the first substrate by a photolithography process comprising different step of exposing a photoresist in plurality of divisional regions, and the divisional common electrodes of the second substrate are separated from one another so as to correspond to the divisional regions of the photoresist.

According to the present invention, since divisional common electrodes are formed on the second substrate so as to correspond to the exposure regions exposed in the step of forming the pattern of the first substrate, the difference in electro-optical characteristics of pixels based on alignment error in the respective exposure regions can be corrected by regulating the potentials of common signals supplied to the divisional common electrodes.

In addition, the potentials of common signals applied to the divisional common electrodes are such that the respective exposure regions maintain the same voltage between the pixel electrode which receives a data signal corresponding to image data and the common electrode which faces the pixel electrode. Hence, the electro-optical characteristics of the pixels in the exposure regions are substantially the same.

Thus, the operation characteristic of every portion of the display device is the same, resulting in uniform brightness and contrast in the overall portion of the display screen.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
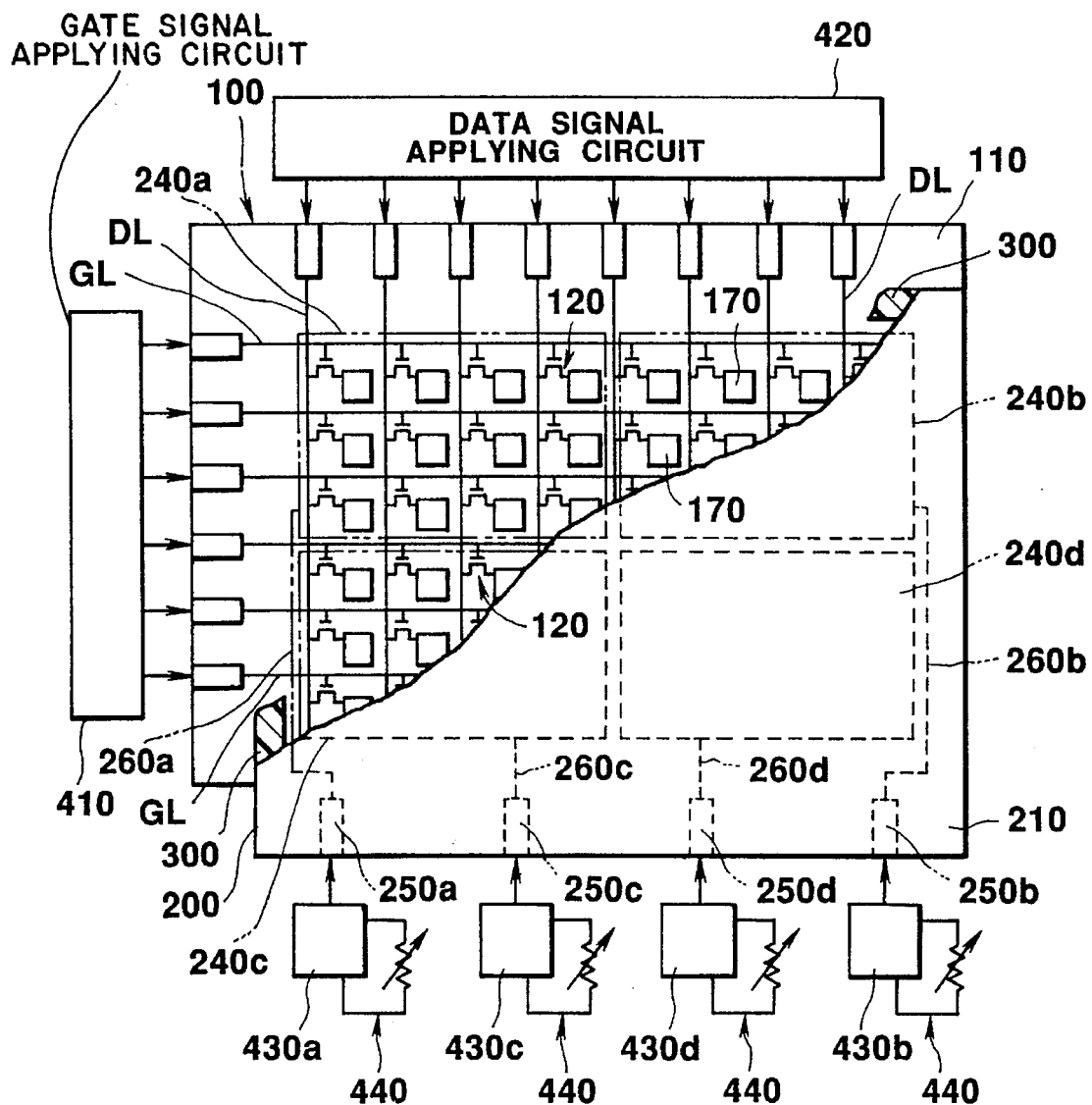
FIG. 1 is a plan view showing an active matrix liquid crystal display device according to an embodiment of the present invention, wherein each thin-film transistor is indicated by a symbol.
Figure 2:
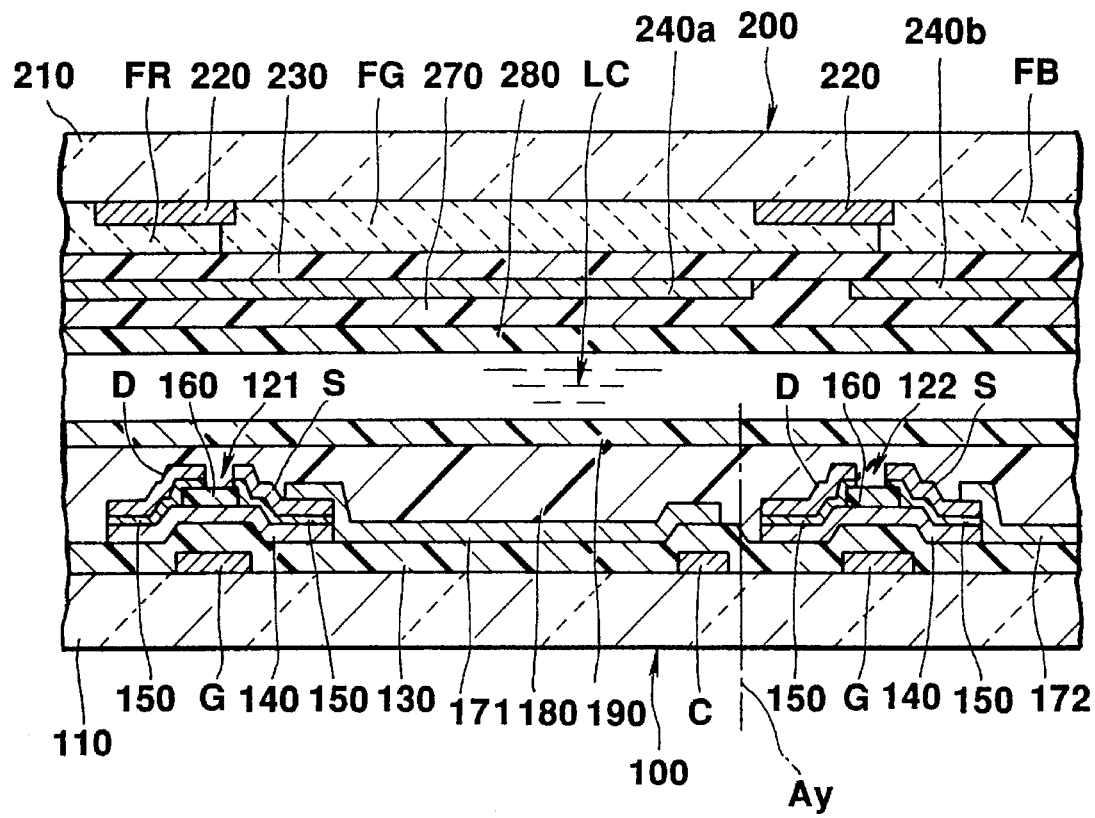
FIG. 2 is an enlarged cross-sectional view of a part of the active matrix liquid crystal display device shown in FIG. 1.
Figure 3:
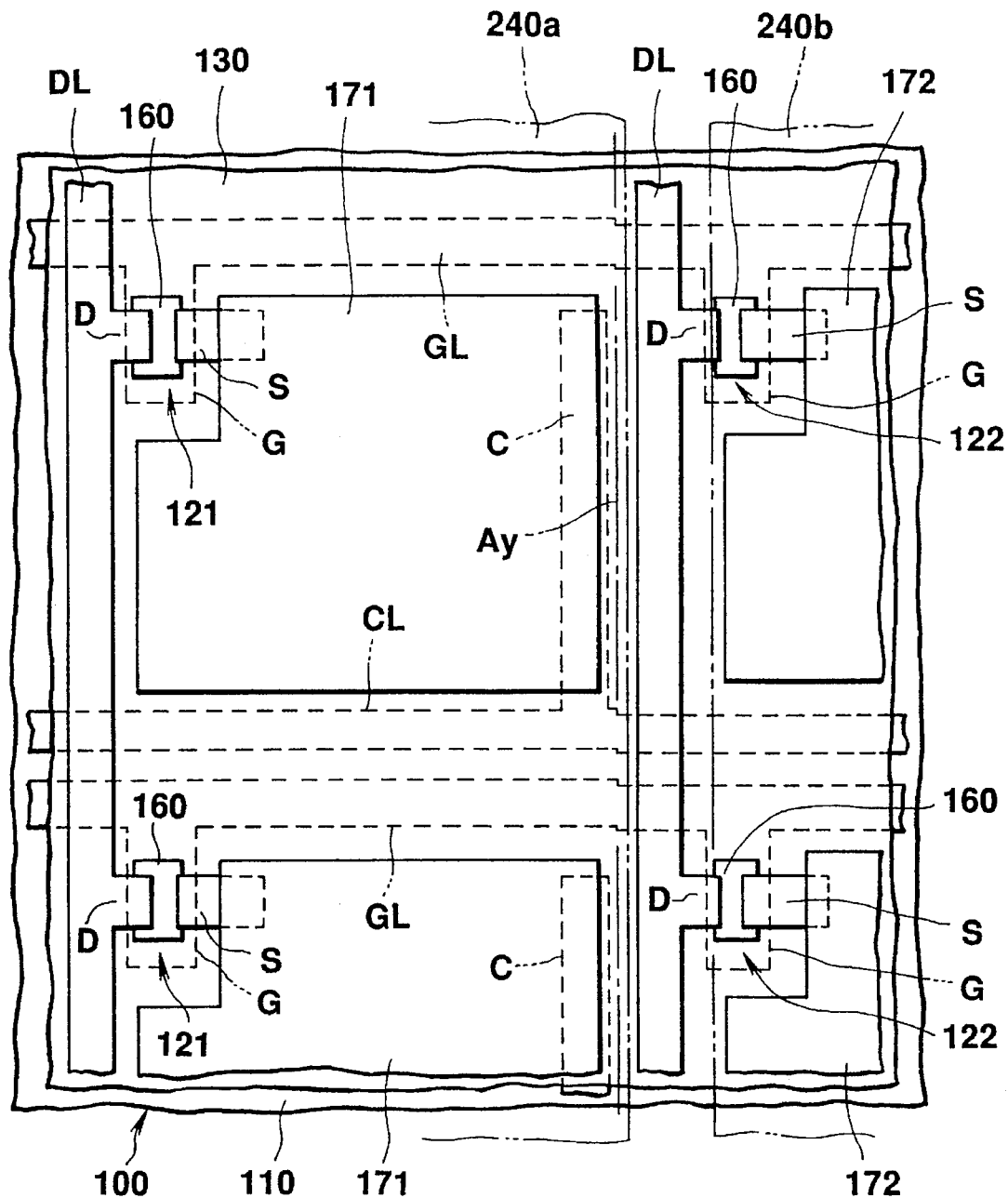
FIG. 3 is an enlarged plan view of a part of the active matrix liquid crystal display device shown in FIG. 1.
Figure 4:
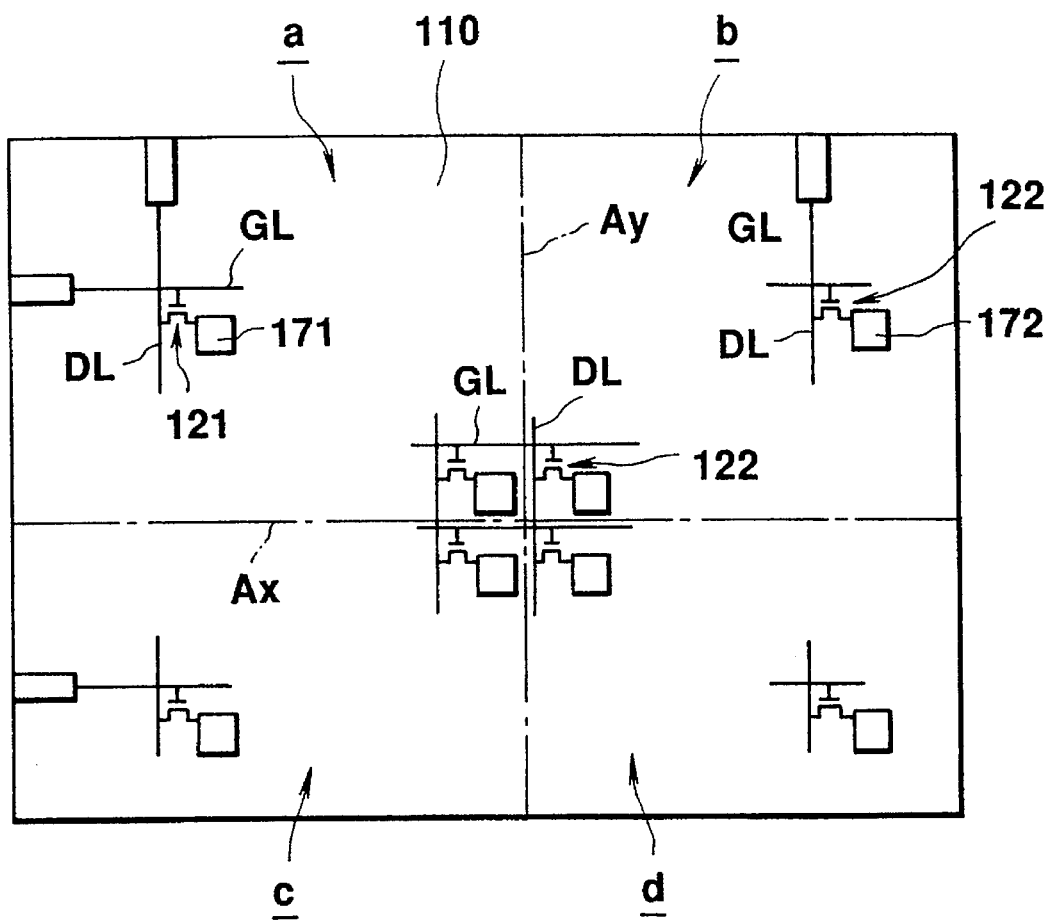
FIG. 4 is a diagram for explaining a step of divisional exposure in a photolithography process in manufacturing a substrate on which thin-film transistors in the active matrix liquid crystal display device shown in FIG. 1 are formed.
Figure 5:
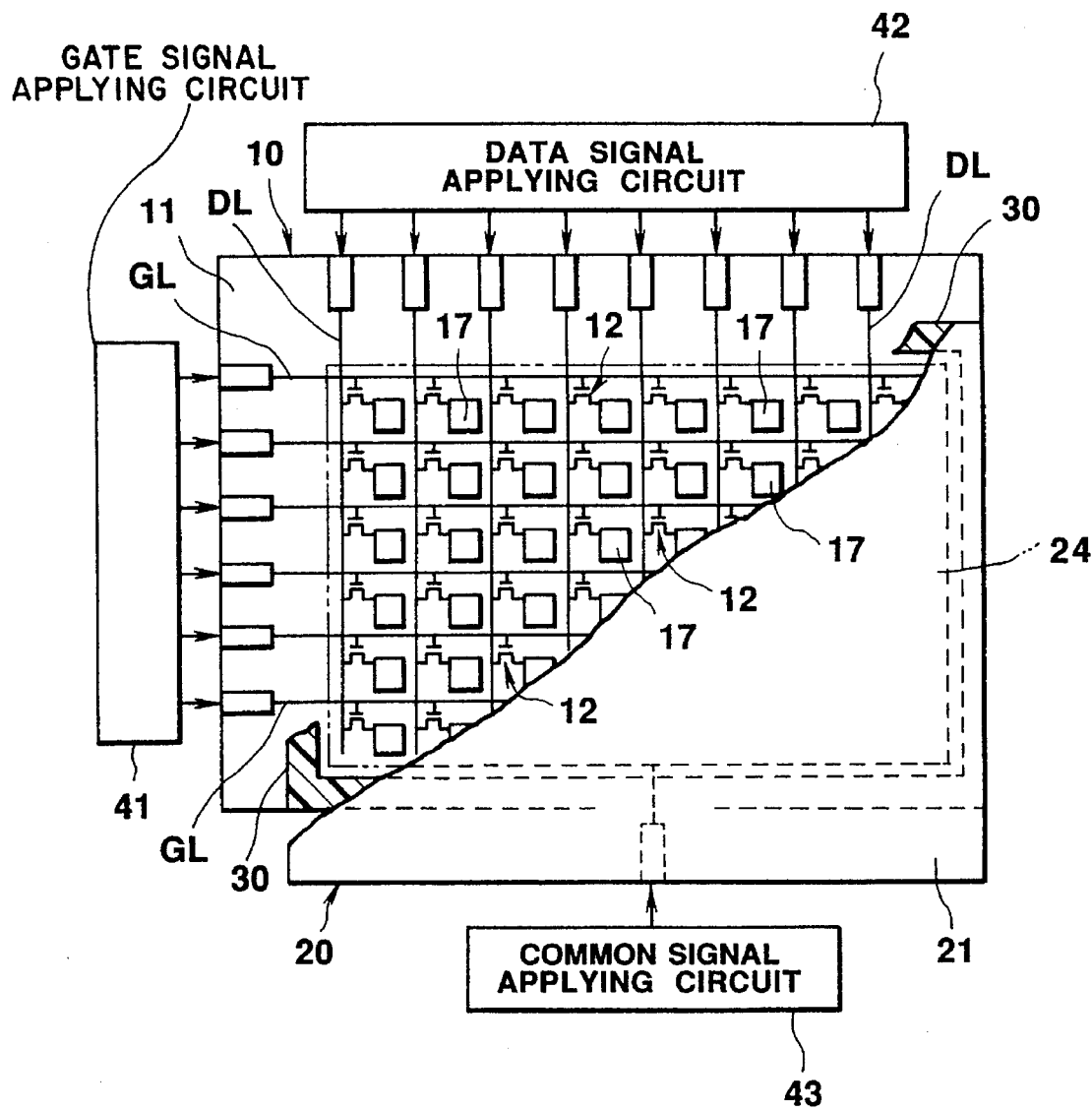
FIG. 5 is a plan view showing a conventional active matrix liquid crystal display device a wherein a thin-film transistor is indicated by a symbol.

An embodiment of the present invention will be described with reference to FIGS. 1 to 4. FIG. 1 is a plan view showing an active matrix liquid crystal display device in which each TFT is indicated by a symbol, FIG. 2 is an enlarged cross-sectional view of a part of the active matrix liquid crystal display device shown in FIG. 1, FIG. 3 is an enlarged plan view of a TFT panel shown in FIG. 2 in which an orientation film and a protecting insulation film are omitted, and FIG. 4 is a diagram showing an example of divisional exposure of a photoresist to form TFTs and pixel electrodes.

The liquid crystal display device comprises a TFT panel 100 and an opposite panel 200 adhered to each other by a frame-shaped sealing member 300, and liquid crystal LC injected into a liquid crystal injection region surrounded by the sealing member 300 between the panels 100, 200.

The TFT panel 100 has a transparent substrate 110 formed of glass or the like, and TFTs 120 and pixel electrodes 170 arranged in a matrix on the substrate 110.

The TFTs 120 are of, for example, a reverse stagger type. As shown in FIGS. 2 and 3, each reverse stagger type TFT 120 comprises a gate electrode G formed on the substrate 110, a gate insulating film (transparent film) 130 made of SiN (silicon nitride) formed on the gate electrode G, an i-type semiconductor layer 140 made of a-Si (amorphous silicon) formed on the gate insulating film 130, and source and drain electrodes S and D formed on an n-type semiconductor layer 150 made of a-Si doped with n-type impurities, which is formed on the i-type semiconductor layer 140. A blocking insulation film 160 is formed on a channel region of the i-type semiconductor layer 140.

The gate electrode G of the TFT 120 is formed integrally with a gate line GL arranged on the substrate 110. The gate insulating film 130 is formed substantially entirely on the substrate 110, covering the gate line GL.

A data line DL and a pixel electrode 170 are formed on the gate insulating film 130. The drain electrode D of the TFT 120 is connected to the data line DL. In this embodiment, the data line DL and the drain electrode D are formed integrally with each other. The pixel electrode 170 is formed of a transparent conductive film such as ITO. An end portion of the pixel electrode 170 overlaps a portion of the source electrode S of the TFT 120, with the result that the pixel electrode 170 is connected with the source electrode S.

Although not shown in FIG. 1, storage capacitors are formed on the TFT panel 110 in one-to-one correspondence with pixel electrodes 170.

As shown in FIGS. 2 and 3, a capacitor electrode C, which constitutes a storage capacitor, is formed on the substrate 110. The capacitor electrode C faces the other end portion of the pixel electrode 170 with the gate insulating film 130 interposed therebetween. The storage capacitor is constituted by the capacitor electrode C, the pixel electrode 170, and the gate insulating film 130 sandwiched between these electrodes. The capacitor electrode C is formed integrally with a capacitor line CL arranged on the substrate 110. The capacitor electrode C and the capacitor line CL are made of the same metal film as the gate electrode G and the gate line GL of the TFT 120. An end portion of the capacitor line CL has a terminal (not shown) connected to a reference potential (ground potential).

The data line DL and the pixel electrode 170 are covered by a transparent protecting insulation film 180, on which an orientation film 190 is formed.

The TFT panel 100 is formed as follows. First, a metal film made of Cr, Al, an Al-based alloy, or the like is formed on the substrate 10. The metal film is patterned by photolithography, thereby forming gate electrodes G and gate lines GL of the TFTs 12, capacitor electrodes C and capacitor lines CL simultaneously.

Then, a gate insulating film 130, an i-type semiconductor layer 140, and a blocking insulation film 160 are formed sequentially. The blocking insulation film 160 is patterned by photolithograpy so as to cover a channel region of the i-type semiconductor layer 140.

Thereafter, an n-type semiconductor layer 150 and a source/drain metal film made of Cr, Al, an Al-based alloy or the like are formed. The metal film, the n-type semiconductor layer 150, and the i-type semiconductor layer 140 are patterned by photolithography into a configuration corresponding to the TFTs 120 and the data lines DL. Sequentially, the source/drain metal film and the n-type semiconductor layer 150 are patterned by photolithograpy to form a source electrode (S) region and a drain electrode (D) region. Thereafter, a protecting insulation film 180 is formed, and an orientation film 190 is formed thereon. Thus, a TFT panel 110 is completed.

In forming the TFT panel 110 as described above, when the electrodes of TFTs 120 (gate electrodes G and source and drain electrodes S and D), the i-type semiconductor layer 140, the blocking insulation film 160, and the pixel electrodes 170 are patterned by photolithography, the photoresists are exposed by divisional exposures. In other words, the region including the TFTs 120 and the pixel electrodes 170 is divided into a plurality of exposure regions, which are consecutively exposed.

The divisional exposures of the photoresists will be explained. In this embodiment, as shown in FIG. 4, the surface of the substrate 110 is divided into four exposure regions a, b, c, and d by two boundary lines $A_x$ and $A_y$ indicated by the one-dot-chain lines which cross at right angles with each other, and the respective regions are separately exposed.

More specifically, the substrate 110 on which photoresist is deposited is placed in an exposure apparatus (stepper). In the exposure apparatus, the substrate 110 is moved back and forth and right and left to make the exposure regions a, b, c, and d successively face an exposure portion so that the regions a, b, c, and d are successively exposed, using exposure masks corresponding to the respective patterns of the exposure regions.

In the above divisional exposures of photoresists, since the accuracy in movement of the substrate 110 in the stepper and the accuracy in setting of the exposure masks include errors, the exposure patterns of the photoresists deviate in the exposure regions a, b, c, and d. For this reason, each of the exposure regions a, b, c, and d includes deviation of the positions of the electrodes, which are patterned by etching by use of a resist mask formed by exposing and developing the photoresist.

Deviation of the electrodes or the like in the exposure regions a, b, c, and d occurs in the step of patterning the metal film for forming the gate electrodes G and the capacitor electrodes C, the step of patterning the blocking insulation film 160, the step of patterning the source/drain metal film, the n-type semiconductor layer 150, and the i-type semiconductor film 140 into the configuration of the transistors, and the step of patterning the source/drain metal film and the n-type semiconductor layer 150 into the source electrode region and the drain electrode region. Moreover, deviations in the respective steps vary in degree and direction. Therefore, the exposure regions a, b, c, and d vary in the positional relationship between the gate electrodes G and the source and drain electrodes S and D of the TFTs on the substrate 110 and the positional relationship between the capacitor electrodes C and the pixel electrodes 170.

An example of deviation of the positional relationship between electrodes will be described. TFTs 121 and 122 and pixel electrodes 171 and 172 shown in FIGS. 2 and 3 are formed near the boundary between the exposure regions a and b as shown in FIG. 4. (These TFTS and the pixel electrodes are the same as the TFT 120 and the pixel electrode 170 shown in FIG. 1; however, the reference numerals 121, 122, 171, and 172 are assigned to these element for convenience of explanation.) In FIGS. 2 and 3, the source and drain electrodes S and D of the TFT 121 in the exposure region a are deviated from the gate electrode G in an upper right direction of the drawing. The source and drain electrodes S and D of the TFT 122 in the exposure region b are deviated from the gate electrode G in an upper left direction of the drawing. The pixel electrode 171 in the exposure region a is deviated from the capacitor electrode c in an upper left direction of the drawing. The pixel electrode 172 in the exposure region b is deviated from the capacitor electrode (not shown) in an upper right direction of the drawing. In FIG. 3, the gate line GL and the capacitor line CL in the region a are deviated from those lines in the region b in a line-width direction (upper direction in FIG. 3).

As shown in FIGS. 2 and 3, in the TFT 121 of the exposure region a, the area in which the gate electrode G faces the source electrode S is relatively small and the area in which the gate electrode G faces the drain electrode D is relatively large. In the TFT 122 of the exposure region b, the area in which the gate electrode G faces the source electrode S is relatively great and the area in which the gate electrode G faces the drain electrode D is relatively small. Therefore, the TFT 121 of the exposure region a and the TFT 122 of the exposure region b are different in the ratio of the G-S capacitance (the capacitance between the gate electrode G and the source electrode S) to the G-D capacitance (the capacitance between the gate electrode G and the drain electrode D). Accordingly, the pixel including the TFT 121 and the pixel electrode 171 connected thereto in the exposure region a has an electro-optical characteristic different from that of the pixel including the TFT 122 and the pixel electrode 172 connected thereto in the exposure region b.

Further, the area in which the pixel electrode 171 faces the capacitor electrode C is relatively small in the exposure region a and the area in which the pixel electrode 172 faces the capacitor electrode C is relatively large in the exposure region b. Accordingly, the capacitance of the storage capacitor in the exposure region a differs from that of the storage capacitor in the exposure region b.

The above differences in capacitances apply to the relationship between the exposure regions c and d. Thus, the exposure regions a, b, c, and d are different in the positional relationship between the gate electrode G and the source electrode S or the drain electrode D of the TFT 120 and the positional relationship between the capacitor electrode C and the pixel electrode 170. Therefore, even if the same data signal is supplied from the data line to the exposure regions a, b, c, and d, the exposure regions have different voltages between the pixel electrode 170 and the common electrode.

To overcome the above problem, an opposite panel 200 which faces the TFT panel 100 with a liquid crystal layer interposed therebetween has four common electrode sections corresponding to the exposure regions a, b, c, and d of the TFT panel 100.

The opposite panel 200 will now be described. Referring to FIGS. 1 and 2, a lattice black mask 220 having a shape corresponding to the space between the rows and the columns of the pixel electrodes 170 of the TFT panel 100 is formed on a transparent substrate 210 made of glass or the like. Red, green, and blue color filters FR, FG, and FB corresponding to the pixel electrode columns of the TFT panel 100 are also formed on the substrate 210. A transparent protecting film (an insulating film made of SiN or the like) 230 covers the color filters FR, FG, and FB. Common electrodes 240a, 240b, 240c, and 240d are formed on the protecting film 230.

The common electrodes 240a, 240b, 240c, and 240d, respectively correspond to the exposure regions a, b, c, and d of the TFT panel 110. The common electrodes 240a, 240b, 240c, and 240d are partitioned by an insulating portion which faces the black mask 220.

Common signal applying terminals 250a, 250b, 250c, and 250d for applying a common signal to the common electrodes 240a, 240b, 240c, and 240d are provided at an edge portion of the substrate 210. The common electrodes 240a, 240b, 240c, and 240d are respectively connected to the common signal applying terminals 250a, 250b, 250c, and 250d via lead lines 260a, 260b, 260c, and 260d. The common electrodes 240a to 240d, the terminals 250a to 250d, and the lead lines 260a to 260d are formed of a conductive film (transparent conductive film of ITO or the like) by photolithograpy patterning. The common electrodes 240a to 240d and the lead lines 260a to 260d are covered by a transparent insulating film 270 made of SiN or the like, on which an orientation film 280 is formed.

Terminal portions of the gate lines GL are connected to a gate signal applying circuit 410. Terminal portions of the data lines DL are connected to a data signal applying circuit 420. The terminals 250a, 250b, 250c, and 250d of the common electrode portions 240a, 240b, 240c, and 240d are respectively connected to common signal applying circuits 430a, 430b, 430c, and 430d. The above-described active matrix liquid crystal display device is driven by these signal applying circuits.

When a data signal corresponding to a piece of image data is supplied to the pixel electrodes 170 of the exposure regions a, b, c, and d, the common signal applying circuits 430a, 430b, 430c, and 430d apply, to the common electrodes 240a, 240b, 240c, and 240d, common signals having potentials such that the voltages respectively maintained between the pixel electrodes 170 of the exposure regions a, b, c, and d on the one hand, and the common electrodes 240a, 240b, 240c, and 240d, on the other are the same. For this purpose, the common signal applying circuits 430a, 430b, 430c, and 430d are provided with voltage regulators 440 for regulating the voltage value of a common signal. Each voltage regulator 440 is constituted by a variable resistor which is formed by sealing its operating section after control of the voltage.

Thus, the active matrix liquid crystal display device compensates the difference in voltage between the pixel electrodes 170 of the exposure regions a, b, c, and d on the one hand, and the common electrodes 240a, 240b, 240c, and 240d, on the other by regulating the potentials of common signals applied to the common electrodes 240a, 240b, 240c, and 240d. As described above, the opposite panel 200 has four common electrodes 240a, 240b, 240c, and 240d respectively corresponding to the exposure regions a, b, c, and d, to which common signals having different potentials in accordance with the ratio of the G-S capacitance to the D-S capacitance of the TFT in the exposure regions a, b, c, and d of the TFT panel 100 are supplied. Therefore, substantially the same electrical field is applied to the liquid crystal LC of the pixels in the exposure regions a, b, c, and d, thereby obtaining uniform brightness and contrast of the display in the exposure regions a, b, c, and d.

The potentials of common signals supplied to the common electrodes 240a, 240b, 240c, and 240d are regulated as follows. First, a test image is displayed on the liquid crystal display device. Then, the voltage regulators 440 of the common signal applying circuits 430a, 430b, 430c, and 403d are controlled so that the brightness and contrast of the display of the exposure regions a, b, c, and d are uniform in the entire portion of the display.

As described above, according to the present invention, although the electrodes (the gate electrodes G, and the source and drain electrodes S and D) of the TFTs 120 and the pixel electrodes 170 on the TFT panel 100 are patterned by divisionally exposing the photoresists, an image of uniform brightness and contrast can be obtained in the entire portion of the screen.

In the above embodiment, the common electrodes 240a, 240b, 240c, and 240d are one-piece electrodes respectively cover the exposure regions a, b, c, and d of the TFT panel 110 entirely. However, each common electrode is not limited to the one-piece electrode, but can be subdivisional electrodes constituted by common electrode groups each corresponding to one or more columns of pixel electrodes 170. In this case, it is only necessary to apply, to the common electrode groups, common signals having potentials corresponding to floating capacitances of the TFTs in the respective exposure regions a, b, c, and d.

What is claimed is:

1. A liquid crystal display device comprising:
   a first substrate having a predetermined pattern and including a plurality of thin-film transistors, each thin-film transistor having a predetermined configuration and each thin-film transistor including a plurality of thin films, a gate electrode, a source electrode, and a drain electrode, a plurality of pixel electrodes respectively connected to the thin-film transistors, a plurality of gate lines for connecting to the gate electrodes of the thin-film transistors, and a plurality of drain lines for connecting to the drain electrodes of the thin-film transistors, the predetermined pattern being formed by a photolithography process comprising steps of exposing different photoresists in a plurality of divisional regions;
   a second substrate having a plurality of divisional common electrodes which face the plurality of pixel electrodes and which are separated from one another so as to correspond to the divisional regions; and
   a liquid crystal material provided between the first and second substrates and interposed between the plurality of pixel electrodes and the plurality of divisional common electrodes;
   wherein common signals respectively supplied to the plurality of divisional common electrodes have potentials corresponding to a ratio of a capacitance between a gate electrode and a source electrode to a capacitance between the gate electrode and a drain electrode of the thin-film transistors in the divisional regions which are divisionally exposed to form the pattern of the first substrate.

2. A liquid crystal display device according to claim 1, wherein:
   the thin-film transistors and the pixel electrodes are arranged in a matrix; and
   the plurality of divisional common electrodes are separated from one another along the gate lines and along data lines.

3. A liquid crystal display device according to claim 1, wherein the divisional region has the pattern which is formed by a photolithography process comprising a step of exposing the photoresist by using a stepper.

4. A liquid crystal display device comprising:
   a first substrate having a predetermined pattern and including:
      a plurality of thin-film transistors, each thin-film transistor having a predetermined configuration, each thin-film transistor including a plurality of thin films, and each thin-film transistor comprising a gate electrode, a source electrode and a drain electrode;
      a plurality of pixel electrodes respectively connected to source electrodes of the thin-film transistors;
      a plurality of gate lines for connecting to gate electrodes of the thin-film transistors; and
      a plurality of drain lines for connecting to drain electrodes of the thin-film transistors,
      the first substrate further including a plurality of divisional regions, an area in which a gate electrode overlaps with source and drain electrodes being different in every divisional region;
   a second substrate having a plurality of divisional common electrodes which face the plurality of pixel electrodes and which are separated from one another so as to correspond to the divisional regions; and
   a liquid crystal material provided between the first and second substrates and interposed between the plurality of pixel electrodes and the plurality of divisional common electrodes.

5. A liquid crystal display device according to claim 4, wherein:
   common signals are supplied to the plurality of divisional common electrodes; and
   the common signals have potentials such that the divisional regions have a same voltage maintained between a pixel electrode to which a data signal corresponding to a piece of image data is supplied and a divisional common electrode which faces the pixel electrode.

6. A liquid crystal display device according to claim 4, further comprising common signal supplying means for supplying common signals to the divisional common electrodes and which regulates potentials of the common signals.

7. A liquid crystal display device according to claim 6, wherein the common signal supplying means comprises a plurality of common signal supplying circuits respectively connected to the divisional common electrodes.

8. A liquid crystal display device according to claim 6, wherein the common signal supplying means comprises regulating means for regulating potentials of the common signals so that the divisional regions maintain the same voltages between pixel electrodes to which data signals corresponding to substantially the same image data are supplied and divisional common electrodes which face the pixel electrodes.

9. A liquid crystal display device according to claim 6, wherein the common signal supplying means comprises:
   signal generating means for generating a common signal; and
   potential variable means for regulating a potential of the common signal.

10. A liquid crystal display device according to claim 4, wherein each of the plurality of divisional regions includes a plurality of thin-film transistors, a ratio of an area in which a gate electrode overlaps with a source electrode to an area in which the gate electrode overlaps with a drain electrode being different in every thin-film transistor.

11. A liquid crystal display device according to claim 4, wherein each of the plurality of divisional regions includes a plurality of thin-film transistors, a ratio of a first capacitance formed in an area in which a gate electrode overlaps with a source electrode to a second capacitance formed in an area in which the gate electrode overlaps with a drain electrode being different in every thin-film transistor.

12. A liquid crystal display device according to claim 4, further comprising a plurality of common signal supplying circuits for supplying common signals to the divisional common electrodes, and wherein potentials of signals output from the common signal supplying circuits are variable.

13. A liquid crystal display device according to claim 12, wherein each of the common signal supplying circuits comprises means for supplying common signals to the electrodes such that a voltage applied across a pixel electrode and a common electrode which faces the pixel electrode is the same in the plurality of divisional regions.

14. A liquid crystal display device according to claim 12, wherein each of the common signal supplying circuits comprises means for supplying to every divisional common electrode a voltage corresponding to a ratio of a first capacitance formed in an area in which a gate electrode overlaps with a source electrode to a second capacitance formed in an area in which the gate electrode overlaps with a drain electrode.

15. A liquid crystal display device according to claim 4, further comprising capacitor electrodes, arranged so as to respectively overlap the pixel electrodes of the thin-film transistors, for forming storage capacitances for holding potentials applied to the pixel electrodes, wherein an area in which each of the capacitor electrodes overlaps with the pixel electrode is different in every divisional region.

16. A liquid crystal display device according to claim 15, wherein the plurality of divisional regions have a plurality of storage capacitances, capacitance values of which are different in every divisional region.

17. A liquid crystal display device according to claim 4, wherein:
   the thin-film transistors and the pixel electrodes are arranged in a matrix; and
   the plurality of divisional common electrodes are separated from one another along the gate lines and along data lines.

18. A liquid crystal display device according to claim 4, wherein the divisional region has the pattern which is formed by a photolithography process comprising a step of exposing the photoresist by using a stepper.

19. A liquid crystal display device comprising:
   a first substrate having a predetermined pattern and including:
      a plurality of thin-film transistors, each thin-film transistor having a predetermined configuration, including a plurality of thin films, and comprising a gate electrode, a source electrode and a drain electrode;
      a plurality of pixel electrodes respectively connected to the source electrodes of the thin-film transistors;
      a plurality of gate lines for connecting to the gate electrodes of the thin-film transistors; and
      a plurality of drain lines for connecting to the drain electrodes of the thin-film transistors,
      said first substrate further including a plurality of divisional regions, an area in which the gate electrode overlaps with the source and drain electrodes being different in every divisional region;
   a second substrate having a plurality of divisional common electrodes which face the plurality of pixel electrodes and which are separated from one another so as to correspond to the divisional regions;

a liquid crystal material provided between first and second substrates and interposed between the plurality of pixel electrodes and the plurality of divisional common electrodes;

means for successively supplying a gate signal to the plurality of gate lines;

means for supplying a data signal corresponding to image data externally supplied to the plurality of drain lines; and a regulator for regulating a potential of a common signal to be supplied to each of the plurality of divisional common electrodes formed on the second substrate.

20. A liquid crystal display device according to claim 19, further comprising:

means for generating common signals; and regulating means for regulating potentials of the common signals so that the divisional regions maintain the same voltages between pixel electrodes to which data signals corresponding to substantially a same image data are supplied and divisional common electrodes which face the pixel electrodes.

* * * * *